Oct. 24, 1967 F. K. BECKER ET AL 3,349,333

PHASE-STABLE FREQUENCY DIVIDER

Filed May 28, 1965 2 Sheets-Sheet 1

INVENTORS F. K. BECKER
C. W. FARROW

BY Charles Scott Phelan

ATTORNEY

Oct. 24, 1967 F. K. BECKER ETAL 3,349,333

PHASE-STABLE FREQUENCY DIVIDER

Filed May 28, 1965 2 Sheets-Sheet 2

United States Patent Office 3,349,333

Patented Oct. 24, 1967

3,349,333

PHASE-STABLE FREQUENCY DIVIDER

Floyd K. Becker, Colts Neck, and Cecil W. Farrow, Monmouth Hills, N.J., assignors to Bell Telephone Laboratories, Incorporated, New York, N.Y., a corporation of New York Filed May 28, 1965, Ser. No. 459,810
6 Claims. (Cl. 328—48)

ABSTRACT OF THE DISCLOSURE

A counter circuit, driven by a pulse source having a known pulse repetition frequency, phase synchronizes an inertial oscillator tuned to the nominal frequency of an output of the counter. If pulses from the pulse source are momentarily removed from the counter circuit, the inertial oscillator continues to oscillate and serves to prevent phase ambiguity at the counter output if the pulses are reapplied before the phase of the inertial oscillator has substantially drifted.

Figure 1:
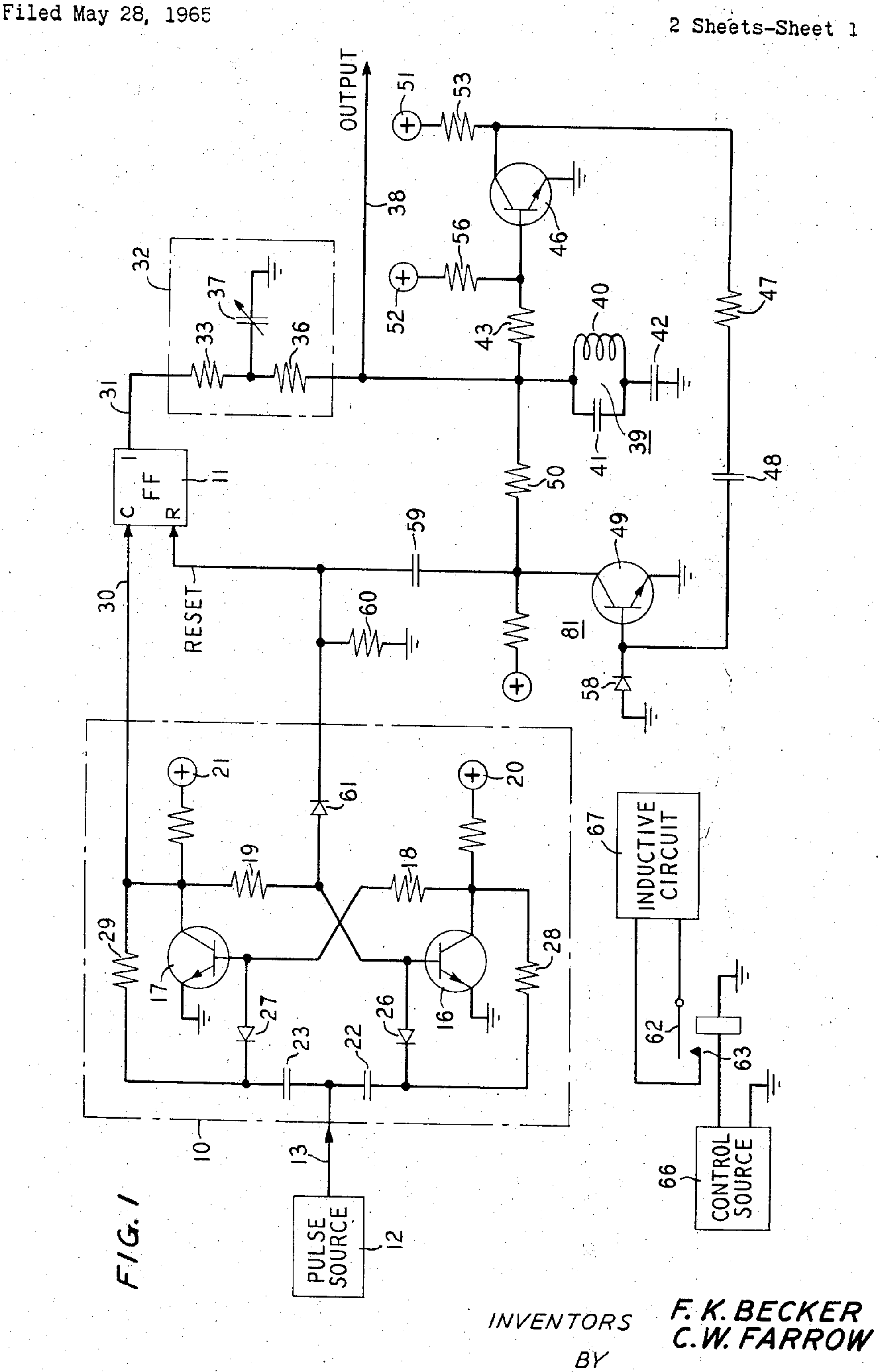

This invention relates to a phase-stable frequency divider and, more particularly, to such frequency dividers which are characterized by digital operation.

In certain situations it is convenient, and sometimes also necessary, to employ a digital frequency dividing circuit. An example of such a circuit is a binary counter including a chain of tandem-connected bistable multivibrator circuits. It has been found, however, that frequency dividing circuits of this type, and particularly those which employ transistors in the aforementioned bistable circuits, are subject to spuriously generated phase jumps between the output and input signals thereof.

Such phase jumps may result from any number of possible causes which cause one or more parts of a frequency dividing circuit to operate at a time when it is not supposed to be operated in the course of its regular frequency dividing function. These disturbances may result from some internal circuit function or from some aspect of power supply operation; or from electromagnetic radiation from an electrical arc; or from any other energy source. The spurious frequency divider operation resulting from such disturbances can be most troublesome in any phase-dependent circuits which receive the output of the frequency divider as is well known in the art.

The art has, however, not produced circuits which are conveniently able to detect and correct a spurious phase jump condition in the output of a frequency dividing circuit. High inertia circuits such as parallel resonant or tank circuits have been used to stabilize the phase of analog frequency dividers which perform division by large ratios in order to insure an output signal transition in response to certain one of a train of input pulses. However, the injection of spurious energy pulses into such analog frequency dividing circuits does not appreciably affect the output phase thereof. Under worst case conditions, a spuriously injected pulse in such an analog frequency dividing circuit may blank out certain input pulses at critical triggering time; but in such a case the tank circuit usually triggers circuit operation immediately thereafter and without the help of a subsequent input pulse. This operation affects only minor leading edge time jitter in the analog frequency divider output signal wave. It does not produce a serious phase change such as, for example, one of ninety or more electrical degrees. Furthermore, such jitters does not work a permanent change in the phase of operation of the frequency dividing circuits as in the case in digital frequency dividing circuits.

It is therefore one object of the invention to improve the phase stability of frequency dividing circuits.

It is another object to stabilize the phase of the output signal from a digital frequency divider against the effects of spuriously injected phase jumps.

A further object is to protect a frequency divider against continuous operation at an incorrect phase condition with respect to the input signal wave driving such divider.

These and other objects of the invention are realized in an illustrative embodiment in which a frequency dividing circuit synchronizes an inertial oscillator circuit that is tuned to the divided frequency of the frequency divider output. The output of the oscillator is utilized to reset the frequency divider to a predetermined condition of operation during each oscillator output cycle, if the divider is not then in that condition.

It is a feature of the invention that the oscillator frequency is determined by a parallel resonant circuit which is also connected as a dynamic phase clamp on the output provided from the frequency divider for external utilization.

It is another feature that a phase shifting circuit adjusts the phase of the frequency divider output signal so that the output of the oscillator occurs in a predetermined phase relationship with respect to the input signal which is supplied to the frequency divider.

Figure 2:
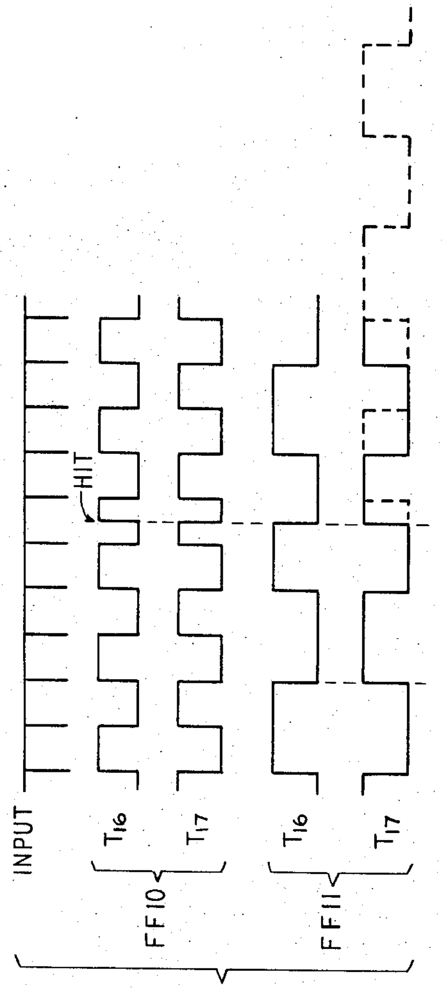
Figure 3:
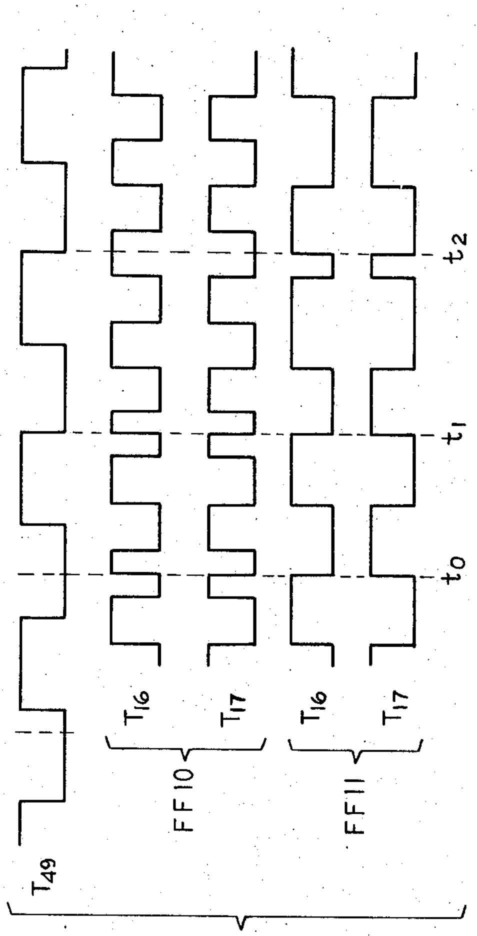

A more complete understanding of the various features of the invention may be obtained from the following detailed description when taken in connection with the appended claims and the attached drawings in which:

FIG. 1 is a schematic diagram of a frequency dividing circuit in accordance with the invention; and FIGS. 2 and 3 are signal voltage waveform diagrams, drawn to a common time scale, for illustrating the operation of the invention.

In FIG. 1 the frequency divider and hit protector circuit of the present invention are illustrated. The frequency divider comprises a two-stage binary counter which includes two bistable, or flip-flop, circuits 10 and 11 that are arranged to count negative-going pulses from the output of a pulse source 12. Source 12 may be any source of signal pulses from which it is desired to obtain a subharmonic frequency wave. The flip-flop circuit 10 receives the input signal frequency $f$ on a lead 13. Each of the flip-flop circuits is the same as the other so only the flip-flop 10 is shown in detail.

Flip-flop circuit 10 includes two transistors 16 and 17 with their base and collector electrodes cross-coupled by two resistors 18 and 19 for operation as a bistable multivibrator. Emitter electrodes of transistors 16 and 17 are grounded. Operating potential is provided by two positive potential sources 20 and 21 schematically represented as circled plus signs. Such sources have their negative terminals grounded.

Input lead 13 is coupled to the base electrodes of both transistors 16 and 17 through separate paths including capacitors 22 and 23 in series with diodes 26 and 27. The diodes are poled for conduction away from their respective transistor base electrodes to make the flip-flop circuit responsive to negative input pulses. Resistors 28 and 29 connect the collector electrodes of transistors 16 and 17 to the cathode side of their respective input diodes to complete a complementing type of input connection for the circuit. In the absence of input pulses one transistor conducts, and the capacitors assume charges such that the next negative-going input pulse transition pulls the diode of the conducting transistor on and biases such transistor off. Conduction is then regeneratively transferred to the other transistor in the usual manner.

The binary ONE output of flip-flop circuit 10 appears at the collector electrode of transistor 17 on a lead 30. That lead applies a negative-going voltage transition to the complementing input connection of flip-flop 11 each time transistor 17 is triggered into conduction. Similarly, flip-flop 11 produces a negative-going voltage transition at its binary ONE output each time that its transistor 17 is biased on. A circuit 31 couples the binary ONE output of flip-flop circuit 11 to a phase shifting circuit 32. That circuit includes two series-connected resistors 33 and 36 and a shunt-connected variable capacitor 37. The manner of setting the phase shift capacitor 37 will be subsequently discussed.

The output signal at the subharmonic frequency $f/n$ is derived on a lead 38 from the output of phase shifter 32 where $n$ is the frequency dividing factor of the circuit. $n$ is equal to four for the dividing circuit illustrated in FIG. 1. That output is also coupled to a tank circuit 39 including a parallel-connected coil 40 and a capacitor 41 which have a resonant frequency at the frequency $f/n$. A blocking capacitor 42 couples tank circuit 39 to ground. Tank circuit 39 is an inertial circuit element that is adapted to hold a predetermined phase condition on lead 38 for a time of at least twice the period of the wave at frequency $f/n$ even though conditions of the flip-flops may suddenly experience a change tending to produce a substantial phase jump on that lead. Thus, tank circuit 39 is a phase clamp on lead 38.

Tank circuit 39 is included in an oscillatory circuit arrangement that is synchronized by the output signal on lead 38. The signal across the tank is coupled through a resistor 43 to the input of a first common emitter amplifier stage transistor 46, which drives through a coupling network including a series-connected resistor 47 and capacitor 48 to another common emitter amplifier stage including a transistor 49. The collector electrode output of transistor 49 is further coupled through a resistor 50 back to the tank circuit 39 to provide a closed oscillatory loop with appropriate gain to sustain oscillations at the resonant frequency of $f/n$ cycles per second.

Resistors 33, 36, 43, and 50 are advantageously all of the same size, but this is not necessary to operation. They must be large enough to decouple all circuits except the lead 38 from the tank to avoid loading of the tank. Transistor 46 is biased by sources 51 and 52 and resistors 53 and 56 so that it operates primarily in the linear portion of its characteristics. Resistor 47 and capacitor 48 couple the signal to transistor 49 and drive it between saturation and cutoff. A diode 58 connected to the base electrode of transistor 49 is a negative limiter that shunts down that electrode for negative turn-off signals to prevent the accumulation of a negative charge on capacitor 48.

The collector electrode of transistor 49 is also coupled through a differentiating circuit including a capacitor 59 and a resistor 60 to the reset input connections of the two flip-flop circuits 10 and 11. In each flip-flop the reset connection comprises a diode 61 coupling capacitor 59 to the base electrode of transistor 16. Diode 61 is poled away from the latter transistor. Consequently, each negative-going transition occurring as transistor 49 is driven into saturation is differentiated and turns off the transistors 16 if any of them is conducting. The differentiated impulses thus provided reset the binary counter stages if those stages are not already in the reset condition when such pulses appear.

Under proper operating conditions the phase shift injected by the phase shifting circuit 32 is adapted so that the negative-going differentiated impulses coupled from capacitor 59 to the flip-flop stages 10 and 11 ideally arrive at times when the corresponding flip-flop circuit transistors 16 are in the nonconducting condition. This is achieved by adjusting capacitor 37 until the negative resetting impulses applied to the flip-flop circuits occur approximately midway between a pair of input pulses on lead 13. This time is also after the normal triggering of transistors 16 by such input signals on lead 13. Accordingly, maximum leeway is allowed for possible drift in the circuit of tank 39 without improperly resetting the flip-flops. If transistors 16 are off at the time of the negative differentiated impulses, those impulses have no effect upon the binary counter operation. However, if the transistors have been disturbed and any one is in a conducting condition, an erroneous state of operation of the binary counter is indicated. Then such negative differentiated impulses reset both stages of the counter and thereby reestablish the phase of the output signal on lead 31 in the same relationship to the input signal on lead 13 that existed before the disturbance.

It is well known that a variety of factors can spuriously alter the operation of digital countdown circuits. For example, one such factor is believed to be radio frequency interference. Such interference can be generated by an arc produced between a pair of relay contacts 62, 63 which control a utilization circuit 67 such as the inductive load represented by another relay operating coil when the first-mentioned relay is operated by a control source 66. Electromagnetic energy radiated by the arc may be coupled to the leads of a counter circuit. Such energy coupling can cause the state of one or more stages of the counter circuit to change in a spurious manner. The change, of course, effects a change in the phase of the output wave and can adversely affect the operation of any phase-sensitive circuits utilizing such wave.

FIG. 2 illustrates the operation of the circuits of FIG. 1 under normal conditions and in response to a spurious hit of the type previously mentioned, but without the benefit of hit protection. Collector voltage waveforms are shown for the flip-flop circuit transistors. The regularly recurring input negative pulses at frequency $f$ alternately bias the transistors 16 and 17 in flip-flop 10 off. Odd input pulses trigger the transistor 16 off and the resulting negative-going transitions at the collector electrode of the transistor 17 actuate the flip-flop 11 in similar manner.

A hit of the type previously described is indicated in FIG. 2 between two input pulses at a time $t_0$. It is assumed that the hit is negative and affects all conducting transistors in the frequency divider the same, i.e., it biases them off. It would also have a similar effect upon the transistors 46 and 49, but the effect is only momentary since they are not connected in multistable circuits. The flip-flop circuits are triggered early by the hit, but they still respond in the usual manner to the input pulse which follows the hit. Consequently, the transistors of flip-flop 10 end up operating in inverted phase with respect to their pre-hit condition; and those in flip-flop 11 end up operating with a 90-degree leading phase. The broken-line waveform in FIG. 2 shows how the transistor 17 in flip-flop 11 would have continued to operate if there had been no hit.

In FIG. 3 the collector voltage waveform for the transistor 49 is shown along with additional flip-flop waveforms illustrating the hit protector operation. The wave from transistor 49 is essentially the same as the FIG. 2 wave for transistor 17 in flip-flop 11 except that it has a lagging phase relationship therewith. As a result, its negative transitions come after the start of the nonconducting interval of the transistors 16 which receive reset signals in each flip-flop circuit. The hit occurs at time $t_0$ when the transistor 49 is already conducting, but the electrical inertia of tank circuit 39 prevents the output phase from changing for at least two cycles. In that time the flip-flops are reset to proper phase as previously described and as shown in FIG. 3.

At time $t_1$, the first negative transition in the output of transistor 49 since the hit appears and resets transistor 16 of flip-flop 10 to a nonconducting condition. In flip-flop 11 the corresponding transistor is already off, and the negative output transistor from flip-flop 10 turns off the transistor 17 in flip-flop 11. It can now be seen by comparing the waves of FIGS. 2 and 3 that the output from flip-flop 11 is 180 electrical degrees out of phase with respect to its pre-hit condition, but the correction is not complete. At time $t_2$, just after flip-flop 11 has been triggered by flip-flop 10 to put transistor 16 of the former circuit in a conducting condition, the second post-hit negative transition from transistor 49 occurs. The flip-flop 11 is reset by that output transition of transistor 49, but the flip-flop 10 is not disturbed because it had already been restored to proper phase at time $t_1$. Now the output of flip-flop 11 is in the same phase as the broken-line wave in FIG. 2; and it is, therefore, in proper phase with respect to the input signal on lead 13. Similar results are obtainable over different numbers of frequency divider stages as long as the possible drift range of the oscillator circuit with tank 39 is no more than the input signal period divided by the frequency division factor $n$. If the hit had occurred at a time when transistor 49 was off, the phase correction would have been accomplished in less than two cycles of the frequency $f/n$.

Although the present invention has been described in connection with a particular embodiment thereof, it will be understood that additional embodiments and modifications that will be obvious to those skilled in the art are included in the spirit and scope of the invention.

What is claimed is:

1. In combination:

a chain of tandem-connected bistable circuits, means supplying a train of recurrent pulses to the first of said bistable circuits in said chain, an inertial oscillator coupled to be synchronized by the last of said bistable circuits in said chain, and a differentiating circuit coupling said oscillator to reset all of said bistable circuits to a predetermined condition of stability during each cycle of oscillator operation.

2. In combination:

a plural-stage counting circuit responsive to an input signal at a first lead for producing an output signal lower in frequency than said input signal by a predetermined integral factor, said plural-stage counting circuit being responsive at a second lead to a reset signal to bring said plural-stage counting circuit to a predetermined state, a tuned circuit responsive to said output signal for providing a reference signal having the same frequency as said output signal and a predetermined phase relationship thereto; and means responsive to said reference signal for providing said reset signal.

3. A phase-stable frequency dividing circuit comprising:

a binary counter responsive at a first lead to a timing signal at a frequency $f$ for providing an output signal at a frequency $f/n$, $n$ being an integer, said binary counter being responsive at a second lead to a reset signal to drive said binary counter to a predetermined state, an oscillatory circuit tuned to said frequency $f/n$ for providing said reset signal to said second lead, and phase shifting means responsive to said output signal for applying a synchronizing signal to said oscillatory circuit.

4. In combination:

a counting circuit responsive to a train of pulses recurring at a fixed repetition frequency for providing an output signal having a frequency repetition rate related to said fixed repetition frequency, said counting circuit being responsive to a reset signal for bringing said counting circuit to a predetermined state, and an inertial circuit responsive to said output signal for providing said reset signal.

5. The combination in accordance with claim 4 in which:

a phase shifting circuit is provided to couple said counting circuit to said inertial circuit so that said reset signal normally coincides with said predetermined state of said counting circuit.

6. The phase-stable frequency dividing circuit defined in claim 3 wherein:

a parallel-connected coil and capacitor circuit are included in said oscillatory circuit, and a differentiating circuit applies said reset signal to said second lead.

References Cited

UNITED STATES PATENTS

| | | | |
|---|---|---|---|
| 2,688,701 | 9/1954 | Norton. | |
| 2,860,247 | 11/1958 | Brooks | 328—39 XR |
| 3,052,854 | 9/1962 | Holzer et al. | |
| 3,182,265 | 5/1965 | Wu | 328—223 XR |

ARTHUR GAUSS, *Primary Examiner.*

J. ZAZWORSKY, *Assistant Examiner.*